United States Patent

Massar et al.

[15] 3,691,491

[45] Sept. 12, 1972

[54] SUPERCONDUCTIVE SWITCHING PATH FOR HEAVY CURRENT

[72] Inventors: Ernst Massar, Hans Voigt, both of Erlangen, Germany

[73] Assignee: Siemens Aktiengesellschaft, Berlin and Munich, Germany

[22] Filed: Dec. 4, 1970

[21] Appl. No.: 95,088

[30] Foreign Application Priority Data

Dec. 13, 1969 Germany..........P 19 62 704.4

[52] U.S. Cl.................................335/216, 317/13 D

[51] Int. Cl...............................................H01f 7/22

[58] Field of Search...........335/214, 216; 200/166 C; 317/13 D

[56] References Cited

UNITED STATES PATENTS

| | | | |
|---|---|---|---|
| 3,239,725 | 3/1966 | Wiederhold | 335/216 |
| 3,008,044 | 11/1961 | Buchhold | 335/216 X |
| 3,263,133 | 7/1966 | Stekly | 317/13 D |

*Primary Examiner*—George Harris
*Attorney*—Curt M. Avery, Arthur E. Wilfond, Herbert L. Lerner and Daniel J. Tick

[57] ABSTRACT

A magnetic shield of superconducting material is positioned in the vicinity of a superconductive winding having current flowing therethrough. When the shield is in a superconductive condition, the magnetic lines of force produced by the winding are forced into a longer path than without the shield, so that the magnetic field within the winding is smaller than the lowest critical field intensity at any point of the winding. When the current in the winding reaches a predetermined intensity, the shield loses its shielding effect at least partially, due to the increased magnetic field, so that the magnetic lines of force are shortened and the magnetic field increases within the winding to a magnitude above the highest critical magnetic field intensity at any point of the winding passed by the predetermined current.

20 Claims, 8 Drawing Figures

SUPERCONDUCTIVE SWITCHING PATH FOR HEAVY CURRENT

DESCRIPTION OF THE INVENTION

The invention relates to a superconductive switching path for heavy current. More particularly, the invention relates to a switching path for heavy current comprising at least one superconductive winding which may be switched from a superconducting to an electrically normal conducting condition through it intrinsic magnetic field.

Due to the increasing interconnection of current supply systems or networks and the resultant increase in short-circuit capacity, there is an increasing need for reliable and economical current limiting devices in the field of electric power supply. When such current limiting devices are able to switch so rapidly that they disconnect the area of the short-circuit, even prior to the occurrence of the full amplitude of the short-circuit current, or are able to reduce the current to a low harmless magnitude, generators and the power supply may be relieved of the high dynamic forces of short-circuit currents and even older system or network areas which are rated for lower short-circuit output may remain in operation, fully interconnected.

A switching path comprising a superconductor wound into a winding is suitable for use in such a current limiting device. The winding transfers from a superconductive condition to an electrically normal conducting condition when, due to the current load, a specific critical magnetic field intensity and a corresponding current density are obtained. The superconductor is preferably shaped in the form of a band, strip, tape, or the like, and is arranged in a manner whereby the intrinsic magnetic field which develops within the winding extends in parallel with the surface of the band, strip, tape, or the like. The switching path is preferably connected in parallel with an electrical resistance which receives the current when the switching path transfers from a superconducting to a normal conducting condition and limits the current to a magnitude which may be easily disconnected by a circuit breaker or power switch of known structure, connected in series with the switching path and the resistance. In order to protect the switching path transferring to the normal conducting condition, from too much heat, it is suggested that a protective switch be provided. The protective switch is connected in series with the switching path and disconnects the switching path, which is then normally conducting, following the transfer of the current to the parallel-connected resistance. This is described in an article by E. Massar in "Elektrotechnische Zeitschrift" (Electrotechnical Periodical), Issue A, Volume 89, 1968, pages 335 to 339, particularly page 338, illustration 6, and page 339.

A difficulty associated with the operation of switching paths of the aforedescribed type is to insure that the switching path functions reliably in all operations of said path. The difficulties are caused by the fact that even small differences in the material characteristic of the superconductors and in the development of the magnetic field along the switching path, which is many kilometers in length at high voltages, may initially lead to the transition of only single locations of the switching path from a superconducting to a normal conducting condition. More particularly, those localities of the switching path become normally conducting first, whose critical magnetic field and critical current density are lower, due to the aforedescribed difference in the material properties and the development of the magnetic field, or are reached earlier than those of the other localities of the switching path. These single localities, which are the first localities of the switching path to transfer to an electrically normal conductive condition, may burn out during the transition. The destruction of the entire switching path may be expected, due to the high switching power.

During a very steep increase in the current, for example, in the event of a nearby and saturated short-circuit, as well as at a high amplitude of the short-circuit current far exceeding the critical current of the switching path, the critical range within which the critical magnetic field intensity and current powers of the switching path vary is passed so rapidly that virtually the entire switching path becomes normally conducting rapidly enough so that there is no burn out of individual localities. When the current increases at a slower or lower rate such as, for example, when short-circuits are far removed, or when individual system or network parts or portions are less overloaded, it may be expected, however, that the critical range will not be passed rapidly enough to prevent burn out, damage and/or destruction of the switching path.

A known high voltage switching device prevents the destruction of the superconducting switching path by charging said switching path with an additional rapidly increasing current, so that the critical range, within which the magnitudes for the critical magnetic field intensity vary, is passed sufficiently rapidly. This is provided at the onset of the current increase, depending upon the rate of increase pointing to a high end magnitude or depending upon a predetermined excess current. The rapidly increasing current is provided by a capacitor battery which is connected or switched very rapidly to the switching path, as described in DAS 1,300,970. The capacitor battery must have such a high voltage that, despite the inductivity of the switching path, the ancillary magnetic field is produced rapidly enough. The capacitor battery must also have an adequate capacitance so that the current surge which produces the additional field may last long enough to prevent a transition of the switching path to the super conductive condition, during the zero passage, after the switching process, of the current to be disconnected or limited.

When very high alternating currents are disconnected, even two capacitor batteries, with opposite polarities, may be necessary under certain circumstances. One of the two capacitor batteries is connected or switched by a very rapidly acting device which effects an amplification in the current in the switching path, due to its polarity. If an automatic circuit reclosing is feasible, additional devices for rapid charging of the capacitor battery are required. The technical and economical requirements for such additional devices, including the capacitor batteries, are substantial, and result in the limitation of the possibilities of use of the superconductive switching path.

An object of the invention is to provide a superconductive switching path for heavy current which overcomes the disadvantages of the prior art.

An object of the invention is to obviate the need for such additional devices for a switching path for heavy current, comprising at least one superconductive winding, whose intrinsic magnetic field may switch the winding from a superconducting to an electrically normal conducting condition, and simultaneously provide reliable operation of the switching path.

An object of the invention is to provide a superconductive switching path for heavy current which operates with efficiency, effectiveness and reliability.

In accordance with the invention, magnetic shields of superconducting material are provided in the vicinity of the winding. The magnetic shields are so provided that when they are in a superconductive condition the magnetic lines of force or flux, produced by the winding during the passage of current, are forced into a longer path than when no magnetic shields are utilized. This means that the magnetic field within the winding is lower than the lowest critical magnetic field intensity at any point of the winding. When a predetermined current intensity is attained in the winding, the shield effect of the magnetic shield disappears, at least partially, due to the increase in the magnetic field and due to the resultant shortening of the magnetic lines of force or flux. The magnetic field within the winding then increases to a magnitude above the highest critical magnetic field intensity at any location of the winding which is passed by the predetermined current.

Since the shielding effect of the superconducting shield disappears very rapidly when the critical magnetic field is exceeded, the shortening of the magnetic lines of force or flux causes the magnetic field in the winding to pass the critical range essentially suddenly in one jump. The critical range is the range within which the magnetic field intensities at individual locations of the winding vary. The sudden passage of the critical range causes a very rapid transfer of the entire winding from a superconducting condition to a normal conducting condition and prevents a burn out of the individual locations of the winding and the subsequent destruction of the switching path.

In a preferred embodiment of the switching path of the invention, which is of particularly simple structure, at least two series-connected elongated windings are wound in the same direction, have parallel extending longitudinal axes and are positioned next to each other. A substantially large area shield is provided between the windings. A shield extends parallel to the longitudinal axes of the windings and also extends beyond the ends of said windings. When the shield loses its shielding effect, the magnetic lines of force or flux, which initially encircle the shield, pass through the shield and are thereby shortened.

In another preferred embodiment of the switching path of the invention, a toroidal winding is provided with a gap. A substantially large area shield is provided in the gap and extends in the winding in a direction perpendicular to the magnetic field produced by said winding. In order that the largest possible elongation of the magnetic lines of force or flux may be obtained, with the assistance of the shield, said shield should extend be-yond the center point of the ring formed by the toroidal winding and should extend into the space enclosed by the ring. A further feature of the embodiment provides a particular space saving for the switching path. In this embodiment, several series-connected toroidal windings of variable circumference, each provided with a gap, are coaxially positioned within each other. A shield of substantially large area extends into the windings and is positioned within the gaps thereof perpendicularly to the magnetic field produced by the windings. This embodiment provides a particularly compact structure, especially for switching paths with very long superconductors.

In order to provide a lateral shifting of the magnetic lines of force, it is preferable to surround the windings, sideways, with superconducting shields. Insulating layers are preferably provided between the shields and the windings in order to avoid voltage sparkovers. In a particularly simple embodiment of the switching path of the invention, the shields may comprise superconducting sheets or metals. The shields may also preferably comprise electrically insulated interconnected strips of superconducting material, in order to avoid eddy currents of too great a magnitude. The shields may also comprise superconductive material having openings formed therein. The free edges of the shields may be rounded off to prevent magnetic lines of force or flux of too high a magnitude at said free edges. Otherwise, such magnetic flux may cause a premature transition of the superconducting shields, from a superconductive condition to a normal conductive condition, and may result in a premature loss of the shielding effect. It is particularly preferable that the free edges of the shields have a drop-like cross-section.

The windings which define the switching path preferably comprise band, strip, tape, or the like, shaped superconducting material having a thickness of about 1 to 10 microns. Such a slight thickness permits the switching path to have a high electrical resistance in a normal conducting condition. Also suitable to accomplish this purpose are thin superconductive wires or bands or strips, or the like,, which comprise a plurality of adjacent, parallel-connected superconductive wires. In order to obtain, as far as possible, an equal magnetic field at all localities of the switching path, the windings are preferably provided in one layer. The individual turns of the winding may preferably enclose a rectangular area having longitudinal surfaces which are longer than its breadth or width surfaces. The rectangular area should have the smallest possible cross-section, so that the inductivity of the windings may be kept as low as possible, thereby increasing the rate of switching. In windings of tape, strip, band, or the like, shaped superconducting material, the spaces between the adjacent turns of each winding are preferably less than the width of the tape shaped superconducting material.

In a preferred embodiment of the switching path of the invention, comprising windings of tape, strip, band, or the like, shaped superconducting material, the superconducting material is wound around insulating cylinders positioned coaxially with each other. Each of the insulating cylinders has a gap formed therein. Cylinders of superconducting material are coaxially positioned between the windings formed by the tape shaped superconducting material. Each of the cylinders of superconducting material has a gap formed therein and each of said cylinders functions as a shield. A shield extends perpendicularly to the magnetic field produced by the windings and is positioned within the gaps. The magnetic lines of force or flux may be guided by attachments of magnetically conductive material which are located at the ends of the insulating cylinders bordering each gap.

In order that the invention may be readily carried into effect, it will now be described with reference to the accompanying drawings, wherein.

Figure 5A:
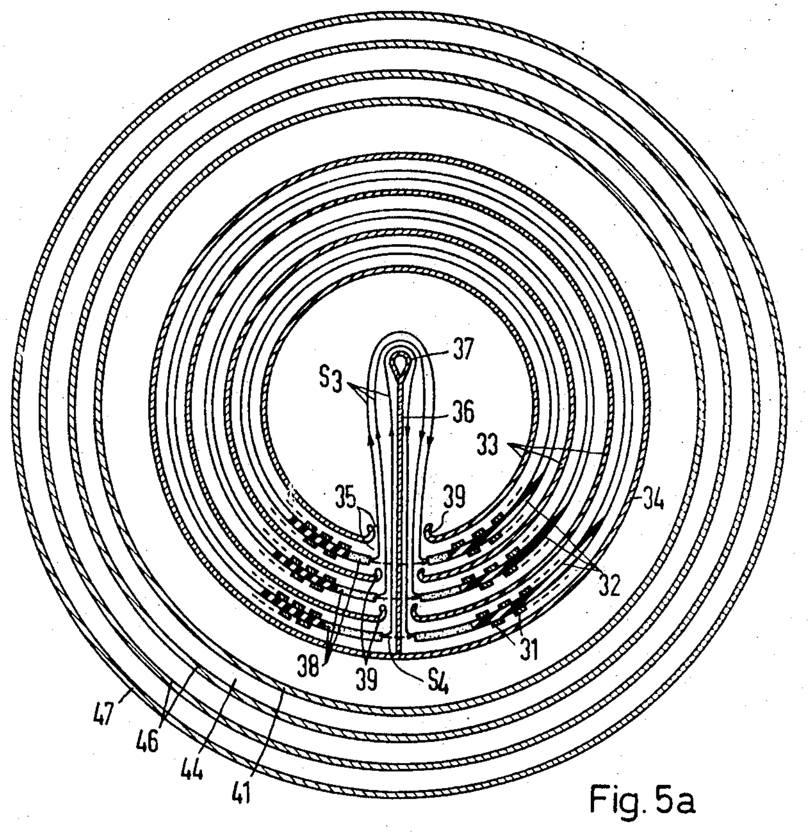
Figure 5C:
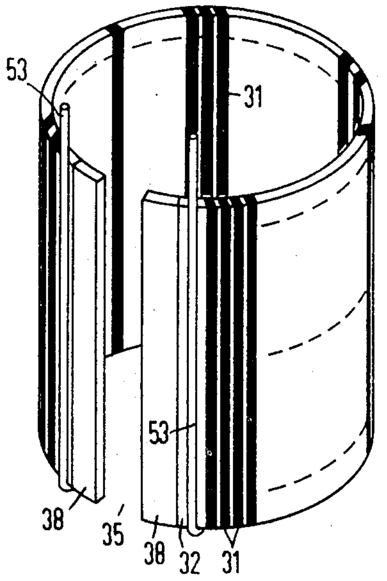
Figure 5B:
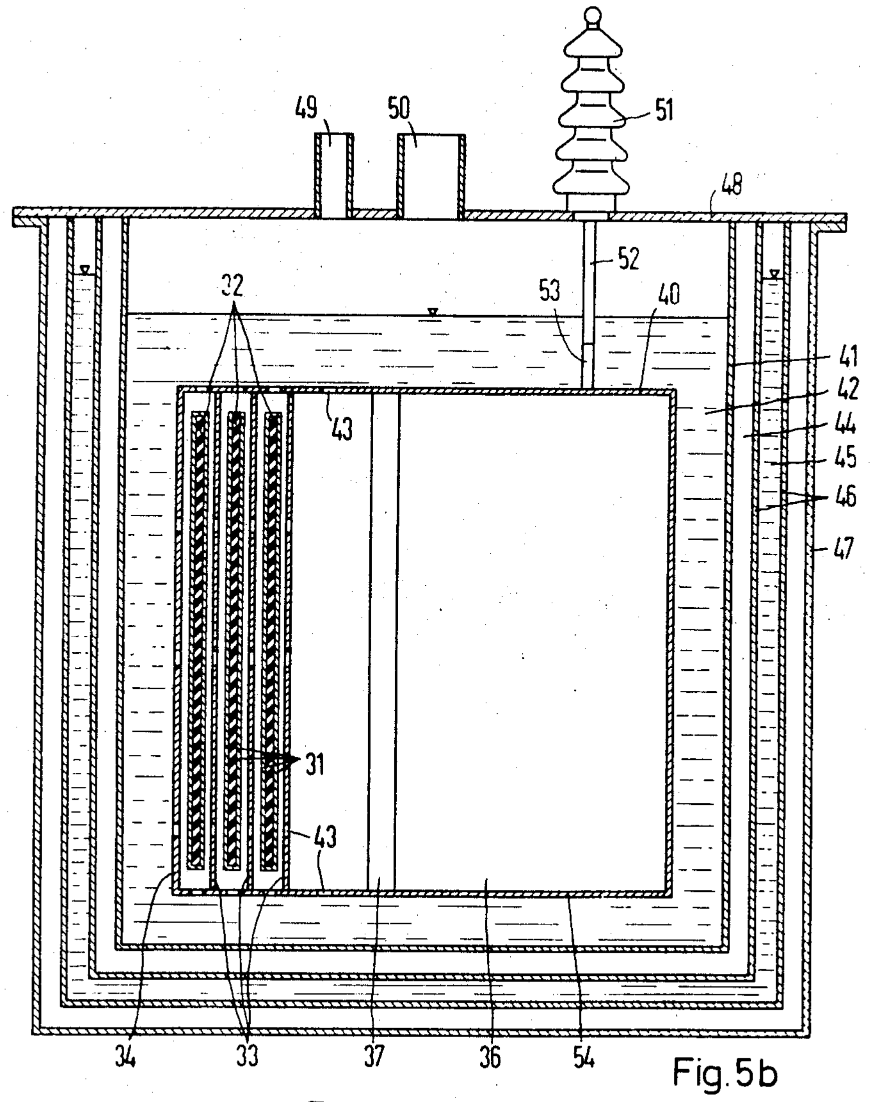
Figure 6:
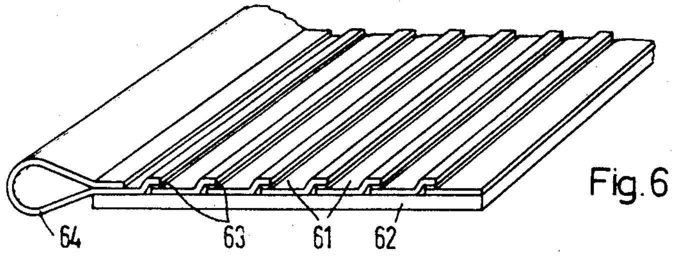

FIGS. 5*a*, 5*b*, and 5*c* are a cross-sectional view, and axial sectional view and a perspective view of a preferred embodiment of the switching path of the invention; and FIG. 6 is a perspective view of an embodiment of a shield for the switching path of the invention.

Figure 1:
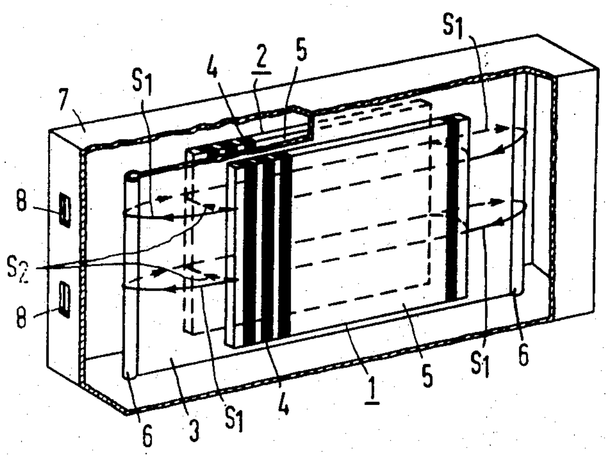
FIG. 1 is a schematic, cutaway, perspective view of an embodiment of the switching path of the invention.

A particularly preferred embodiment of the switching path of the invention, which has the essential features of the invention, is illustrated in FIG. 1. In FIG. 1, the switching path is represented by two elongated windings 1 and 2 having the same winding direction. The windings 1 and 2 are positioned adjacent each other with their longitudinal axes in parallel, and are electrically connected in series with each other. A shield 3 of substantially large area is provided between the windings 1 and 2. The shield 3 comprises, for example, superconducting sheet metal. The shield 3 extends beyond the ends of both windings 1 and 2.

The windings 1 and 2 comprise tape, band, strip, or the like, shaped superconductors 4 which are wound in single layers on synthetic plates 5 of rectangular cross-section. The individual turns of the windings 1 and 2 enclose rectangular areas having longitudinal sides which are longer than their width. Each rectangular area enclosed by one turn should be as small as possible, so that the inductivity of the switching path may become as low as possible. The shield 3 is rounded off at its free edges 6 by flanging of the sheet or other appropriate arrangements or attachment.

Laterally, the windings 1 and 2 are enclosed as closely as possible by additional shields and form, for example, a closed, quadrangular shaped box 7. The box 7 is shown in cutaway form in FIG. 1. There are free spaces between the two free edges 6 of the shield 3 and the front walls or sides of the box 7, through which the magnetic lines of force or flux produced by the windings 1 and 2 may pass. The other two edges of the shield 3 are preferably affixed to the walls or sides of the box 7.

Figures 2, 3:
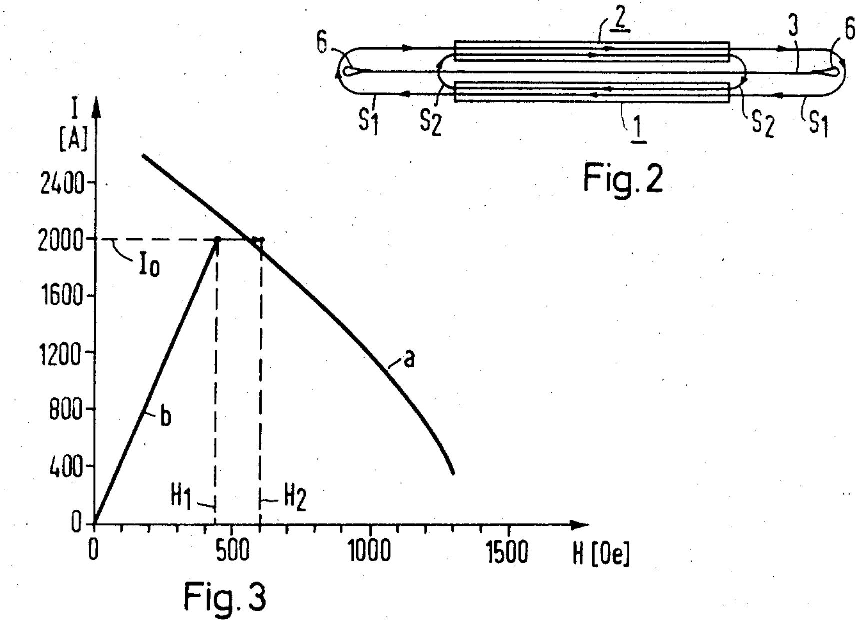
FIG. 2 is a schematic diagram illustrating the course of the magnetic lines of force in the switching path of FIG. 1 in different operating conditions.
FIG. 3 is graphical presentation of the $I_cH$ curve of a switching path of the invention.

During normal operation of the switching path, the windings 1 and 2 and the shield 3 are in superconductive condition. A current flowing through the windings 1 and 2 produces a magnetic field which penetrates the windings. For as long as the shield 3 is superconductive, the magnetic lines of force or flux, produced by the windings 1 and 2, cannot penetrate the shield 3, but are forced to follow the paths $S_1$, which extend around said shield. FIG. 2 illustrates the course of the magnetic lines of force, in a simplified schematic presentation, which shows said lines of force to be parallel to the shield 3.

When the current flowing in the windings 1 and 2 reaches a predetermined intensity $I_o$, the switching path formed by said windings should transfer from a superconductive condition to an electrically normal conductive condition, abruptly. The windings 1 and 2 are especially rated by a selection of appropriately conducting material so that at the current $I_O$ the magnetic field, which is characterized by the magnetic flux paths $s_1$, becomes even somewhat smaller with the windings 1 and 2 than the smallest critical magnetic field at any location of the windings 1 and 2.

On the other hand, the shield 3 is so rated, by appropriate selection of the superconductive material thereof, that the magnetic field generated by the current $I_O$ exceeds the critical magnetic field of the shield 3 at the free edges 6. The free edges 6 then lose their shielding effect so that the magnetic field may pass through the shield 3. Since the field lines become shorter thereby, the magnetic field is additionally increased and rapidly penetrates the portions of the shield 3 which protrude beyond the ends of the windings 1 and 2. The magnetic lines of force or flux then extend along paths $s_2$, as shown in FIGS. 1 and 2.

Due to the rapid shortening of the magnetic lines of force or flux, the magnetic field in the windings 1 and 2 suddenly increases or jumps to a magnitude above the highest critical magnetic field at some point of said windings passed by the current $I_O$. The critical region within which the critical magnetic field of the switching path varies is therefore passed so rapidly by the magnetic field that the windings 1 and 2 transfer completely from the superconducting condition to the electrically normal conducting condition, and this eliminates burn out of the windings due to premature transition of individual localities of the windings from a superconducting condition to a normal conducting condition.

The shield box 7 prevents, in a superconductive condition of the shield 3, feedbacks of the magnetic lines of force or flux on paths shorter than the paths $s_1$. The box 7 preferably comprises superconducting material having a critical magnetic field intensity which is so high that said box remains in a superconducting condition during the transition of the shield 3 to the normal conductive condition. The entire device is arranged in a cryostat, not shown in FIG. 1, which is filled with a coolant such as, for example, helium. The walls or sides of the box 7 are provided with openings 8 through which the liquid coolant may penetrate into the interior of said box.

The shortening of the magnetic lines of force which occurs during the disappearance of the shielding effect of the shield 3 is illustrated with particular clarity in FIG. 2. The increase of the magnetic field within the windings 1 and 2, which is related to the shortening of the magnetic flux or lines of force, may be evaluated in a simple manner. When the total number of turns of the windings 1 and 2 is equal to $w$ and the windings are passed by the current $I_O$, the following equation defines the magnetic field formed by said winding.

$$\oint \vec{H} \cdot d\vec{s} = I_O w$$

Immediately before the shielding effect of the shield 3 disappears, the lines of force or flux extend along the path $s_1$. By assuming, as is justified, that for windings which are not too long the amount of the magnetic field $H$ is constant along the path $s_1$, the following equation is obtained.

$$|H_1| s_1 = I_0 w$$

After the disappearance of the shielding effect of the shield 3, the path $s_1$ is replaced by the path $s_2$. The following equation is then obtained.

$$|H_2| s_2 = I_0 w$$

When the magnetic lines of force or flux pass through or cross the shield 3, the magnetic field in the windings 1 and 2 increases suddenly from the magnitude $H_1$ to $$|H_2| = s_1/s_2 |H_1|$$

The magnitude of the increase of the magnetic field in the windings 1 and 2 is determined by the quotient of both flux paths $s_1$ and $s_2$. That is, the magnitude of the increase of the magnetic field is determined essentially by the fact of how far the shield 3 extends beyond the ends of the windings 1 and 2. The magnetic field in the windings 1 and 2 is increased more, the further the shield 3 extends beyond the ends of the windings 1 and 2. If, for example, the path $s_2$ is shorter than the path $s_1$, by 25 percent, $H_2$ equals 1.33 $H_1$, so that $H_2$ is 33 percent greater than $H_1$. As hereinbefore described, the windings 1 and 2 and the shield 3 are rated so that the lowest critical magnetic field at any point of the winding is smaller than $H_1$ at the current $I_0$, but $H_2$ is greater than the highest critical magnetic field at the current $I_0$ at any location of the winding. Thus, the range or region wherein the critical magnetic field of the superconductor material of the windings 1 and 2 may vary lies between $H_1$ and $H_2$.

The conditions during the operation of a switching path of the invention are more clearly illustrated by the graphical presentation of FIG. 3. FIG. 3 is an $I_cH$ curve for a switching path comprising one winding. In FIG. 3, the abscissa represents the magnetic field and the ordinate represents the current flowing through the winding. The magnetic field of the abscissa is produced by the current flowing through the winding. At a current and at magnetic field magnitudes lying within the range or region enclosed by the curve *a* of FIG. 3 and the corresponding coordinate, the winding is superconducting, and at magnitudes beyond such range or region, it is normal conducting.

When the current I increases through the winding, the magnetic field produced by said winding increases according to a linear curve b of FIG. 3, due to the linear correlation between the current and the magnetic field. When the predetermined current $I_0$ is reached, that is, when the shield 3 is supposed to lose its shielding effect and the switching path is to be controlled or switched, the magnetic field $H_1$ is produced in the winding.

When the shield 3 (FIGS. 1 and 2) loses its shielding effect, the magnetic field suddenly increases abruptly or jumps to the magnitude $H_2$ due to the shortening of the magnetic lines of force or flux, without a further increase of the current within the winding. As clearly illustrated in FIG. 3, the winding becomes normal conducting during this increase of the magnetic field to the magnitude $H_2$. The increase of the straight line b depends upon the special configuration of the winding.

Figure 4:
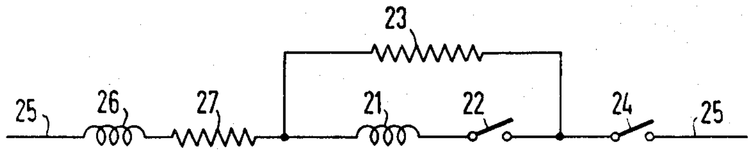
FIG. 4 is a circuit diagram of a switching path of the invention utilized as a current limiting device.

When the switching path of the invention is utilized as a current limiting device, the circuit of FIG. 4 is preferably utilized. The switching path 21 is connected in series with a rapidly switching or operating protective switch 22. A preferably induction-free resistance 23 is connected in parallel with the switching path 21 and the protective switch 22. A circuit breaker or power switch 24 is connected in series with the parallel circuit 21, 22, 23. The inductances and ohmic resistance of the circuit or line 25, wherein the current is to be limited, and of the generator connected to said line, are combined to form an induction 26 and a resistor 27.

In the superconductive condition of the switching path 21, the ohmic resistance of said switching path is zero. The alternating current flowing in the line 25, having an amplitude I, therefore flows almost completely through the switching path 21. When the current I reaches the magnitude $I_0$, as a result of a short-circuit, for example, the switching path 21 transfers from the superconducting condition to the electrically normal conducting condition and its ohmic resistance increases rapidly to a magnitude which is considerably higher than the resistance 23. The current is thus commutated to the resistance 23 and is limited by said resistor to a magnitude which may be easily switched off by the circuit breaker 24.

It is desirable not to charge the switching path 21, which has assumed a condition of normal conductivity, for too long with the residual current which still flows therein. This is achieved by opening the protective switch 22 to open the circuit of the switching path 22, thereby reducing the current therein to zero, after the commutation of the current to the resistance 23. The zero current switching path 21 is then again transferred to the superconducting condition and may be connected into the circuit.

At an operating voltage of, for example, 220 kilovolts, the magnitude of the rated current of the line 25 may be 1,000 Amperes, for example. At the current $I_0$, at which the current limiting device becomes effective, the magnitude of the current may be assumed to be double that of the rated current, or 2,000 Amperes. It may be assumed that the inductance 26 has a magnitude, for example, of 0.03 Henry, and that the resistor 27 has a resistance value of approximately 1 Ohm. The resistor 23 has a resistance value of approximately 155 Ohms, in order to limit the current to 2,000 Amperes. It may be also assumed that the inductance of the switching path 21 has a magnitude of approximately $10^{-3}$ Henry, and that the ohmic resistance of said switching path increases to approximately 2,000 Ohms immediately after the transition of the switching path to the electrically normal conducting condition, whereby the switching path is heated from the temperature of the liquid helium of 4.2° Kelvin to approximately 30° Kelvin.

Under these conditions, the current decreases via the switching path 21 after reaching the magnitude $I_0$, within a period of approximately 50 to 100 microseconds, to a magnitude of about 100 Amperes. During the following period of time, the current decreases additionally, due to the additional temperature increase of the switching path, and is disconnected by the switch 22 after approximately 20 to 50 milliseconds. The current flowing through the resistance 23, which is limited to the magnitude $I_0$, may be easily disconnected by the circuit breaker 24, about 100 to 150 milliseconds after the transition of the switching path to the normal conducting condition.

Without the switching path 21, the complete unlimited short-circuit output during which the amplitude of the current may be 10 to 40 times that of the rated current $I$, would have to be switched off or disconnected by the circuit breaker 24. Additionally, the disconnection or switch off would only occur after the lapse of 100 to 150 milliseconds.

FIGS. *5a*, *5b* and *5c* illustrate a preferred embodiment of a switching path wherein the magnitudes assumed in the foregoing example may be realized. In the embodiment of FIGS. *5a*, *5b* and *5c*, the switching path comprises a plurality of toroidal windings coaxially positioned within each other. FIG. *5a* is a cross-section through the switching path perpendicular to the toroidal axis. FIG. *5b* is a longitudinal section through the switching path, along the toroidal axis. FIG. *5c* is a perspective schematic diagram of a toroidal winding.

The windings comprise niobium bands, strips, tapes, or the like, 31, which are wound on insulating hollow cylinders 32 comprising epoxy resin, reinforced with glass fibers. The walls of the insulating hollow cylinders are of rectangular cross-sectional area, so that the individual turns of the windings enclose an area of rectangular cross-section, having longitudinal sides which are longer than the widths or breadths. The spaces between adjacent turns of the strip, tapes, bands, or the like, 31 are smaller than the width of said strip. This produces, on the one hand, a homogeneous magnetic field within the winding, while on the other hand, relatively much niobium tape 31 may be wound around each insulating hollow cylinder 32. The spaces between adjacent turns should, of course, be large enough so that no voltage sparkovers may occur between said turns.

When edgewise wound strips of insulating material are provided between the turns, the spaces may be reduced to less than 1 mm, so that the current displacement effects in the strips 31 are substantially unimportant.

FIGS. *5a*, *5b* and *5c* do not illustrate the strips of insulating material, in order to maintain the clarity of illustration. Hollow cylinders 33 and 34 of superconducting material are coaxially positioned between the windings and within the innermost winding and outside the outermost winding. The hollow cylinders 33 and 34 of superconducting material function as shields and prevent magnetic lines of flow or flux from transferring directly from one winding to the next.

If the switching path is to be utilized for high voltages, insulating layers may be provided between the windings and the shielding hollow cylinders 33 and 34. For better clarity of illustration, such insulating layers are not illustrated in FIGS. *5a* and *5b*.

Each of the insulating hollow cylinders 32 and each of the shielding cylinders 33 has a gap 35 formed therein. A shield 36 of substantially large area is positioned within the gaps 35 and extends perpendicular to the magnetic field produced by the windings of niobium tape 31. The shield 36 has a free edge 37 which is rounded off and is of substantially drop-shaped cross-section. The drop-shaped cross-section causes the bending or curvature radius of the edge of the shield 36 to become smaller during the penetration of the magnetic field through said shield. This increases the magnetic field at the edge, and results in a very rapid penetration of the magnetic field through the shield 36.

The ends of the insulating hollow cylinders 32 which define, limit or bound the gaps 35 are provided with attachments of magnetically conductive material which serve to guide the magnetic lines of force. The attachments 38 should comprise material of good magnetic conductivity and should have the smallest possible magnetizing losses. A suitable material, for example, is iron powder embedded in electrically insulating material. The attachments 38 may simultaneously be utilized to adjust the switching path.

The superconducting shielding hollow cylinders 33 have edges 39 bordering the gaps 35. The edges 39 of the superconducting shielding hollow cylinders 33 are bent over toward the middle of the space enclosed by said cylinders in order to prevent the occurrence of magnetic field intensities which are too high, in said edges. The outer shielding hollow cylinder 34 is directly affixed to the shield 36.

In a superconducting condition of the shield 36, the lines of force of the magnetic field produced by the windings extend outside said windings, along the paths $s_3$. When the current $I_0$ flows in the windings, the shield 36 becomes normal conducting and loses its shielding effect. The magnetic lines of force then penetrate the shield 36, along the paths $s_4$, shown in broken lines in FIG. *5a*. A considerable shortening of the lines of force may be obtained particularly, as shown in the illustrated embodiment, when the shield 36 extends beyond the middle point of the hollow cylinder 32.

As shown in FIG. *5b*, the shielding hollow cylinders 33 and 34 and the shield 36 may preferably extend beyond the front parts of the hollow cylinders 32 and may be interconnected by a circular superconducting bottom plate 54 and by a circular superconducting cover plate 40, which also provide a shielding effect. The bottom plate 54 and the cover plate 40 assist in preventing the lines of force from shifting to paths above or below the shield 36 which are shorter than the paths $s_3$.

The switching path is located in a container 41 filled with liquid helium 42 during the operation of said switching path. The helium serves as a coolant. Openings 43 are provided in the shielding hollow cylinders 33 and 34 and in the bottom plate 54 and the cover plate 40 so that the liquid helium may flow directly around the shields and the niobium tapes, strips, bands, or the like, 31. The container 41 is thermally insulated from the outside by a vacuum chamber 44. The vacuum chamber 44 is surrounded by a double wall container 46 which is filled by nitrogen 45 and functions as a radiation shield.

The container 46 is enclosed by another container 47, and the space between the container 46 and the container 47 is evacuated to provide thermal insulation. The cryostat formed by the containers 41, 46 and 47 comprises noble steel, for example. The cryostat is schematically shown in FIGS. *5a* and *5b*. The cryostat is closed by a cover 48 (FIG. 5*b*). The cover 48 has a helium inlet 49 and a helium evaporating outlet 50. The helium inlet 49 may be connected to a helium supply device and the helium evaporating outlet 50 may be connected to a helium condensing installation.

The cover 48 is also provided with insulators 51 which provide an insulated input and output of the current supply 52 to the switching path. The current supply 52 comprises metal having normal electrical conducting properties and is connected inside the liquid helium 42 to the superconducting end portions 53 of the tape shaped conductors 31. The end portions 53 may be led out through openings in the cover 40 to the space above said cover. The end portions 53 are preferably reinforced in cross-section, relative to the tapes 31. If the end portions 53 of the individual windings are connected to each other, they are connected in series circuit arrangement.

In order to provide a high ohmic resistance in a normal conducting condition, the niobium strips 31 are preferably very long and have a small cross-section. In a niobium strip which is approximately 4 cm wide, 5 microns thick, and about 20 kilometers long, the ohmic resistance is about 2,000 Ohm, at the aforementioned temperature of approximately 30° Kelvin. The insulating hollow cylinder 32 may be approximately 250 cm in height and may have a wall thickness of about 0.5 cm. The length of one turn of a niobium strip is then approximately 5 meters.

When the distance between adjacent turns is somewhat less than 1 mm, for example, the total length of the hollow cylinder walls to be taped with the bands 31 should be approximately 170 to 180 meters. In order to obtain a wall length of 170 to 180 meters without too great a hollow cylinder diameter, about 20 interpositioned hollow insulating cylinders 32 must have an average circumference of approximately 9 meters. Only three of such cylinders are shown in FIGS. 5*a* and 5*b*, for reasons of better clarity of illustration. The entire diameter of a thus constructed switching path without the cryostat then amounts to about 3 meters.

The inductance of the switching path is in the order of magnitude of $10^{-3}$ Henry. When the current $I_0$ is about 2,000 Amperes, a magnetic field $H_2$ of about 600 Oersteds is produced by the individual windings. By justifiably assuming, in accordance with experimental research, that the $I_cH$ curvature of the niobium tape corresponds to the curve shown in FIG. 3, the shield 36 is so designed that the magnetic field $H_1$ is approximately 450 Oersteds.

When the shield 36 loses its shielding effect, the magnetic field jumps from the magnitude $H_1$ to a magnitude $H_2$ and the switching path becomes normal conducting. Due to the ohmic losses, the temperature of the switching path increases rapidly, accompanied by evaporation of the liquid helium. The switching path is then separated from the circuit and is connected back into the circuit only after it has cooled off, if necessary, by being supplied with liquid helium, and when all the superconductive parts have transferred back to the superconducting condition.

The shields 3 and 36 preferably comprise Type I superconducting materials. Type I superconducting materials are known as soft superconductors. The shields 3 and 36 preferably comprise superconducting materials which function similarly to Type I superconducting materials such as, for example, superconducting materials whose magnetizing curves have only a very slight hysteresis or no hysteresis at all. More particularly, when a transition occurs to the normal conducting state, the magnetic flux may penetrate continually into such superconducting materials, without jumps or abrupt variations in flux.

Suitable superconducting materials may comprise, for lead-bismuth-alloys depending upon the required critical magnetic fields, lead, lead-busmuth-alloys having low bismuth contents up to approximately 10 percent with critical field intensities within a range of approximately 500 to 600 Oersteds at 4.2° Kelvin, as well as pure niobium with a lower critical field intensity of approximately 1,300 Oersteds at 4.2° Kelvin.

By suitable design, especially of the free edges of the shield 36, care must be taken that the critical field intensity of the shield is not prematurely exceeded by the local magnetic field at the edges. The shielding hollow cylinders 33 and 34 and the bottom plate 54 and the cover plate 40 are preferably so designed by a suitable arrangement or selection of material that they maintain their shielding effect when the shield 36 transfers to the normal conducting condition.

Circulating currents are started at the surface of the superconductive shields due to the shielded magnetic field. In order to reduce the areas enclosed by the circulating currents, and thus the inductivities of the shields, said shields may preferably comprise electrically insulated interconnected strips of superconducting material. A shield of this type is shown in FIG. 6; the shield of FIG. 6 comprises niobium strips 61 which are affixed, for example by cement or glue, to an insulating plate 62 and are affixed to each other at their overlapping edges, for example by cement or glue. A suitable cement or glue utilized for the niobium strips 61 may comprise an electrically insulated adhesive 63, or electrically insulated synthetic tapes which are adhesive on both sides. The free edge 64 of the shield is rounded off and preferably comprises, for example, a reinforced bent niobium sheet.

The switching path preferably comprises several windings which are so rated that though each winding may transfer, over its entire length, simultaneously to the superconducting condition, the transfer of the individual windings occurs in sequence, however, for example during the passage of a current wave produced by a short-circuit. Such a switching path may comprise, for example, several winding pairs, as illustrated in FIG. 1. The winding pairs are electrically connected in series and transfer, at a specific delay in sequence, from a superconducting condition to a normal conducting condition, whereby each winding pair becomes normal conductive in its entirety, at the same time.

The switching path of the invention is suitable not only for disconnecting alternating currents, but, in the same manner, for disconnecting direct currents, also.

While the invention has been described by means of specific examples and in specific embodiments, we do not wish to be limited thereto, for obvious modifications will occur to those skilled in the art without departing from the spirit and scope of the invention.

We claim:

1. A switching path for heavy current having at least one superconductive winding having current flowing therethrough and which may be switched from a superconductive condition to an electrically normal conductive condition through its intrinsic magnetic field, said switching path comprising magnetic shield means of superconducting material in the vicinity of the winding positioned in a manner whereby when the shield means is in a superconductive condition the magnetic lines of force produced by the winding during the passage of current therethrough are forced into a longer current ($s_1$) than without the shield means so that the magnetic field within the winding is smaller than the lowest critical field intensity at any point of the winding, and whereby when the ucrrent in the winding reaches a predetermined intensity ($I_0$) the shielding effect of the shield means disappears at least partially due to the increased magnetic field so that the magnetic lines of force are shortened and the magnetic field increases within the winding to a magnitude above the highest critical magnetic field intensity at any point of the winding passed by the predetermined current.

2. A switching path for heavy current having two elongated superconductive windings connected in series and wound in the same direction, said winds being positioned adjacent each other and having parallel longitudinal axes and having current flowing therethrough and which may be switched from a superconductive condition to an electrically normal conductive condition through its intrinsic magnetic field, said switching path comprising a shield of superconducting material positioned between the windings parallel to the longitudinal axes of said windings and extending beyond the ends of said windings in a manner whereby when the shield is in a superconductive condition the magnetic lines of force produced by the windings during the passage of current therethrough are forced into a longer path ($s_1$) than without the shield so that the magnetic field within the windings is smaller than the lowest critical field intensity at any point of the windings, and whereby when the current in the windings reaches a predetermined intensity ($I_0$) the shielding effect of the shield disappears at least partially due to the increased magnetic field so that the magnetic lines of force are shortened and the magnetic field increases within the windings to a magnitude above the highest critical magnetic field intensity at any point of the windings passed by the predetermined current.

3. A switching path as claimed in claim 1, wherein each of a plurality of superconductive windings is of toroidal configuration and has a gap formed therein, and wherein said shield means comprises a shield of substantially large area extending into said windings perpendicular to the magnetic field produced by said windings.

4. A switching path for heavy current having at least one superconductive winding having current flowing therethrough and which may be switched from a superconductive condition to an electrically normal conductive condition through its intrinsic magnetic field, said switching path comprising a shield having a plurality of electrically insulated interconnected strips of superconducting material in the vicinity of the winding positioned in a manner whereby when the shield is in a superconductive condition the magnetic lines of force produced by the winding during the passage of current therethrough are forced into a longer path ($s_1$) than without the shield so that the magnetic field within the winding is smaller than the lowest critical field intensity at any point of the winding, and whereby when the current in the winding reaches a predetermined intensity ($I_0$) the shielding effect of the shield disappears at least partially due to the increased magnetic field so that the magnetic lines of force are shortened and the magnetic field increases within the winding to a magnitude above the highest critical magnetic field intensity at any point of the winding passed by the predetermined current.

5. A switching path for heavy current having at least one superconductive winding having current flowing therethrough and which may be switched from a superconductive condition to an electrically normal conductive condition through its intrinsic magnetic field, said switching path comprising magnetic shield means of superconductive material in the vicinity of the winding positioned in a manner whereby when the shield means is in a superconductive condition the magnetic lines of force produced by the winding during the passage of current therethrough are forced into a longer path ($s_1$) than without the shield means so that the magnetic field within the winding is smaller than the lowest critical field intensity at any point of the winding, and whereby when the current in the winding reaches a predetermined intensity ($I_0$) the shielding effect of the shield means disappears at least partially due to the increased magnetic field so that the magnetic lines of force are shortened and the magnetic field increases within the winding to a magnitude above the highest critical magnetic field intensity at any point of the winding passed by the predetermined current, and a superconductive shield laterally surrounding the winding.

6. A switching path for heavy current having at least one superconductive winding having current flowing therethrough and which may be switched from a superconductive condition to an electrically normal conductive condition through its intrinsic magnetic field, said switching path comprising a shield of superconducting material having free edges rounded off in the vicinity of the winding positioned in a manner whereby when the shield is in a superconductive condition the magnetic lines of force produced by the winding during the passage of current therethrough are forced into a longer path ($s_1$) than without the shield so that the magnetic field within the winding is smaller than the lowest critical field intensity at any point of the winding, and whereby when the current in the winding reaches a predetermined intensity ($I_0$) the shielding effect of the shield disappears at least partially due to the increased magnetic field so that the magnetic lines of force are shortened and the magnetic field increases within the winding to a magnitude above the highest critical magnetic field intensity at any point of the winding passed by the predetermined current.

7. A switching path as claimed in claim 1, wherein the winding comprises one layer.

8. A switching path as claimed in claim 1, wherein the winding comprises a plurality of turns enclosing a substantially rectangularly-shaped area having longitudinal sides which are longer than its width.

9. A switching path for heavy current having a plurality of superconductive windings each of toroidal configuration and having a gap formed therein, said windings defining a ring having a center point and having current flowing therethrough and which may be switched from a superconductive condition to an electrically normal conductive condition through its intrinsic magnetic field, said switching path comprising a shield of superconducting material of substantially large area extending into said windings perpendicular to the magnetic field produced by said windings and extending beyond the center point of said ring into the space enclosed by said ring and positioned in a manner whereby when the shield is in a superconductive condition the magnetic lines of force produced by the windings during the passage of current therethrough are forced into a longer path ($s_1$) than without the shield so that the magnetic field within the windings is smaller than the lowest critical field intensity at any point of the windings, and whereby when the current in the windings reaches a predetermined intensity ($I_0$) the shielding effect of the shield disappears at least partially due to the increased magnetic field so that the magnetic lines of force are shortened and the magnetic field increases within the windings to a magnitude above the highest critical magnetic field intensity at any point of the windings passed by the predetermined current.

10. A switching path for heavy current having a plurality of superconductive windings each of toroidal configuration and having a gap formed therein, said windings being electrically connected in series and being of different circumferences and positioned each within the others and having current flowing therethrough and which may be switched from a superconductive condition to an electrically normal conductive condition through its intrinsic magnetic field, said switching path comprising a shield of superconducting material of substantially large area extending into said windings perpendicular to the magnetic field produced by said windings and positioned in a manner whereby when the shield is in a superconductive condition the magnetic lines of force produced by the windings during the passage of current therethrough are forced into a longer path ($s_1$) than without the shield so that the magnetic field within the windings is smaller than the lowest critical field intensity at any point of the windings, and whereby when the current in the windings reaches a predetermined intensity ($I_0$) the shielding effect of the shield disappears at least partially due to the increased magnetic field so that the magnetic lines of force are shortened and the magnetic field increases within the windings to a magnitude above the highest critical magnetic field intensity at any point of the windings passed by the predetermined current.

11. A switching path for heavy current having a plurality of superconductive windings each of toroidal configuration and having a gap formed therein, said windings having current flowing therethrough and which may be switched from a superconductive condition to an electrically normal conductive condition through its intrinsic magnetic field, said switching path comprising a shield of superconducting material of substantially large area extending into said windings perpendicular to the magnetic field produced by said windings and having free edges rounded off and a drop-like cross-section and positioned in a manner whereby when the shield is in a superconductive condition the magnetic lines of force produced by the windings during the passage of current therethrough are forced into a longer path ($s_1$) than without the shield so that the magnetic field within the windings is smaller than the lowest critical field intensity at any point of the windings, and whereby when the current in the windings reaches a predetermined intensity ($I_0$) the shielding effect of the shield disappears at least partially due to the increased magnetic field so that the magnetic lines of force are shortened and the magnetic field increases within the windings to a magnitude above the highest critical magnetic field intensity at any point of the windings passed by the predetermined current.

12. A switching path as claimed in claim 1, wherein the winding comprises a strip-like superconducting material having a thickness of approximately 1 to 10 microns.

13. A switching path as claimed in claim 5, further comprising insulating layers between the shield and the windings.

14. A switching path as claimed in claim 5, wherein the shield and the superconductive shields comprise superconductive sheet metal.

15. A switching path as claimed in claim 8, wherein each of the windings comprises a strip-like superconducting material having a predetermined width and the turns of each of the windings are spaced from each other by a distance less than the width of the superconducting material.

16. A switching path as claimed in claim 10, wherein said shield further comprises a plurality of substantially hollow cylindrical shields positioned between adjacent ones of the windings, within the innermost winding and outside the outermost winding, a bottom plate and a cover plate, all of superconductive material and all having openings formed therethrough.

17. A switching path as claimed in claim 15, further comprising upright-positioned strips of insulating material between adjacent turns of the windings.

18. A switching path as claimed in claim 16, further comprising a plurality of coaxially positioned insulating hollow cylinders each positioned within the others and each having a gap formed therein, and wherein each of the windings comprises a strip-like superconducting material wound around a corresponding one of the insulating hollow cylinders, said hollow cylindrical shields being positioned between adjacent ones of the insulating hollow cylinders, each of said hollow cylindrical shields having a gap formed therein, and said shield extending perpendicular to the magnetic field produced by said windings and being positioned in the gaps.

19. A switching path for heavy current having at least one superconductive winding, said winding comprising a plurality of turns enclosing a substantially rectangularly-shaped area having longitudinal sides which are longer than its width, the winding comprising a strip-like superconducting material having a predetermined width and the turns of the winding being spaced from each other by a distance less than the width of the superconducting material, the adjacent turns of the winding being spaced from each other a distance of less than 1 mm, and having current flowing therethrough and which may be switched from a superconductive condition to an electrically normal conductive condition through its intrinsic magnetic field, said switching path comprising magnetic shield means of superconductive material in the vicinity of the winding positioned in a manner whereby when the shield is in a superconductive condition the magnetic lines of force produced by the winding during the passage of current therethrough are forced into a longer path ($s_1$) than without the shield so that the magnetic field within the winding is smaller than the lowest critical field intensity at any point of the winding, and whereby when the current in the winding reaches a predetermined intensity ($I_0$) the shielding effect of the shield disappears at least partially due to the increased magnetic field so that the magnetic lines of force are shortened and the magnetic field increases within the winding to a magnitude above the highest critical magnetic field intensity at any point of the winding passed by the predetermined current, and upright-positioned strips of insulating material between adjacent turns of the winding.

20. A switching path as claimed in claim 18, wherein each of the insulating hollow cylinders has ends limiting the gap formed therein, and further comprising an attachment of magnetically conductive material affixed to said ends for guiding magnetic lines of force.

* * * * *